United States Patent
Rust

[15] 3,690,391
[45] Sept. 12, 1972

[54] APPARATUS AND METHOD FOR INCREMENTAL BATCH WEIGHING

[72] Inventor: William Rust, Sale, England

[73] Assignee: Simon Handling Engineers Limited, Stockport, England

[22] Filed: April 22, 1971

[21] Appl. No.: 136,528

[30] Foreign Application Priority Data

May 2, 1970 Great Britain..........21,200/70

[52] U.S. Cl. ..........................177/1, 177/60, 177/81, 177/123
[51] Int. Cl.....G01g 13/04, G01g 15/02, G01g 17/00
[58] Field of Search........177/1, 122, 123, 60, 81, 50, 177/116, 144, 245

[56] References Cited

UNITED STATES PATENTS

| | | | |
|---|---|---|---|
| 2,324,667 | 7/1943 | Baker et al. | 177/123 |
| 2,834,388 | 5/1958 | Meyer | 177/60 |
| 3,058,536 | 10/1962 | Thomson | 177/1 |
| 3,096,837 | 7/1963 | Abbott et al. | 177/81 |
| 3,416,619 | 12/1968 | McClusky | 177/123 |
| 3,557,889 | 1/1971 | Rejsa | 177/1 |

FOREIGN PATENTS OR APPLICATIONS

| | | | |
|---|---|---|---|
| 154,366 | 11/1953 | Australia | 177/60 |
| 492,634 | 9/1938 | Great Britain | 177/1 |

*Primary Examiner*—Robert S. Ward, Jr.
*Attorney*—Norris & Bateman

[57] ABSTRACT

A method of automatically preparing consecutive batches, each of predetermined weight, of material from large undivided masses of such material, comprising the steps of progressing the material through a plurality of stations at each of which pieces of approximately equal size and hence of approximately equal weight are cut from same, each succeeding station cutting smaller pieces than the preceding station, and assembling each batch by selecting and collecting the required numbers of pieces from each of said stations to achieve said predetermined weight.

10 Claims, 3 Drawing Figures

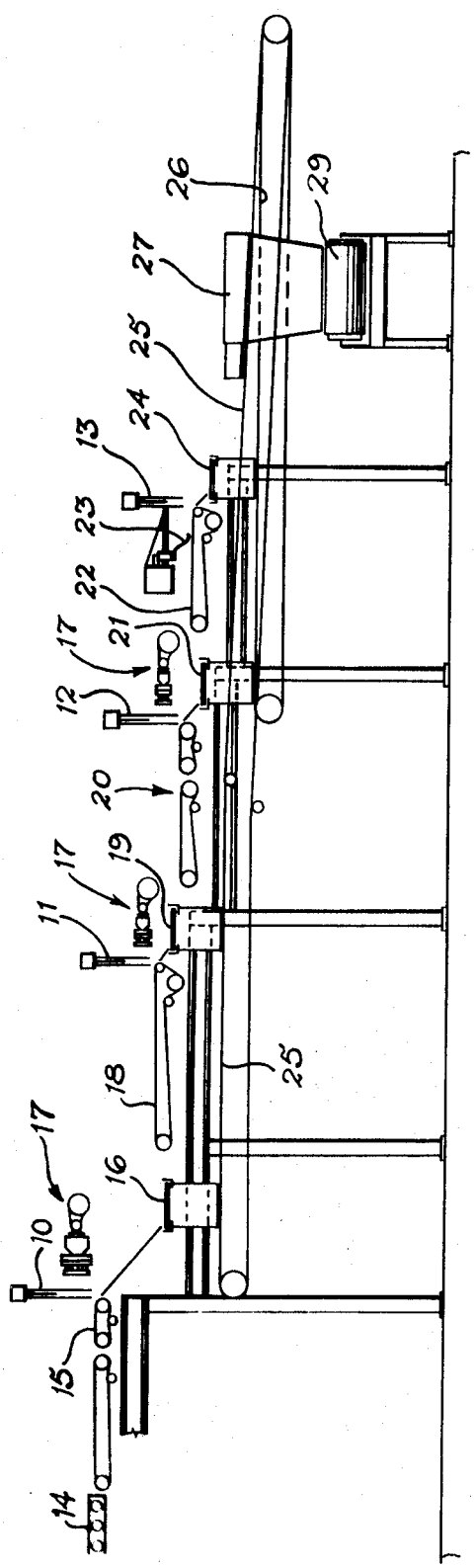
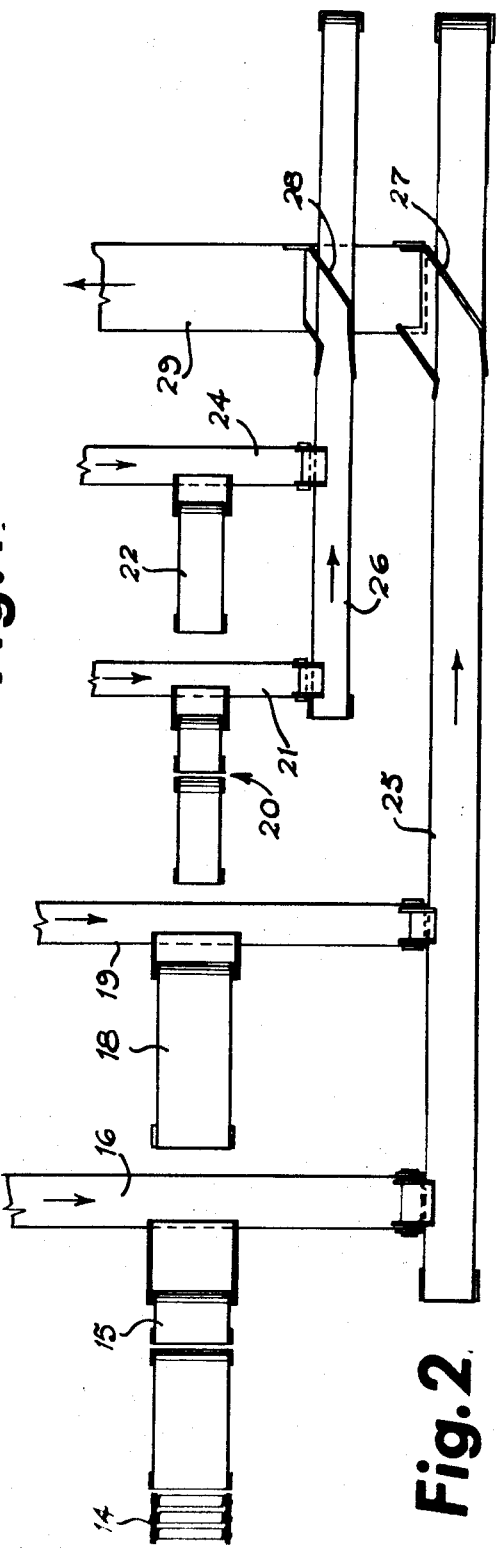
Fig.1.
Fig.2.

3,690,391

APPARATUS AND METHOD FOR INCREMENTAL BATCH WEIGHING

This invention relates to a method and means for preparing consecutive batches, each of predetermined weight, of material from large undivided masses of such material, and more particularly, though by no means exclusively, for preparing weighed batches of rubber from bales of raw rubber.

According to the present invention a method of preparing automatically consecutive batches, each of predetermined weight, of material from large undivided masses of such material, comprises the steps of progressing the material through a plurality of stations at each of which pieces of approximately equal size and hence of approximately equal weight are cut from same, each succeeding station cutting smaller pieces than the preceding station, and assembling each batch by selecting and collecting the required numbers of pieces from each of said stations.

The invention also includes equipment for performing the method aforesaid.

The invention will be further apparent from the following description with reference to the figures of the accompanying drawing, which shown, by way of example only, one form of apparatus for preparing weighed batches of rubber from bales of raw rubber, in accordance with the method of the invention.

Of the drawings:

FIG. 1 shows a schematic side elevation of the apparatus;

FIG. 2 shows a plan view of the apparatus of FIG. 1, parts being omitted for the sake of clarity.

Figure 3:
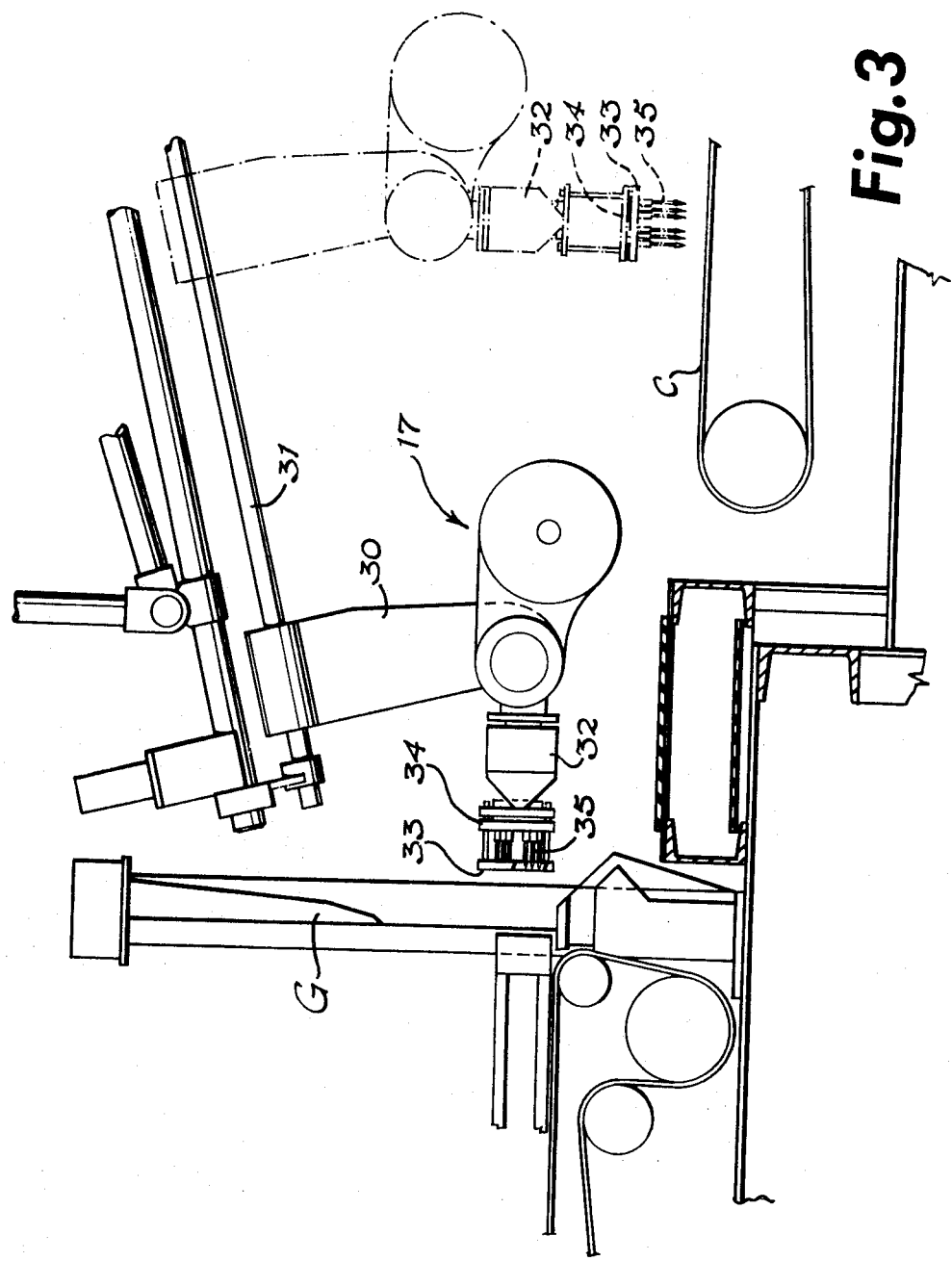
FIG. 3 shows one of the transfer mechanism of FIG. 1 on an enlarged scale.

Referring firstly to FIGS. 1 and 2, it will be seen that the apparatus essentially comprises four guillotines 10, 11, 12 and 13 respectively. Bales of raw rubber are delivered to the apparatus by means of a roller conveyor 14, and can be indexed under the blade of the first guillotine 10 by a conveyor band system 15, all whereby the guillotine 10 can be operated to cut the raw bales into pieces of substantially equal size which either drop onto a transverse conveyor band 16 disposed below and in front of the quillotine 10 or are transferred by the mechanism generally indicated at 17 onto a conveyor band system 18.

Pieces delivered onto the band system 18 can be indexed thereby under the blade of the second guillotine 11 whereby the latter can be operated to cut such pieces into smaller pieces of substantially equal size which either drop onto a transverse conveyor band 19 disposed below and in front of the guillotine 11 or are transferred by a further mechanism 17 onto a conveyor band system 20.

Pieces delivered onto the band system 20 can be indexed thereby under the blade of the third guillotine 12 whereby the latter can be operated to cut such pieces into still further smaller pieces of substantially equal size which either drop onto a transverse conveyor band 21 disposed below and in front of the guillotine 12 or are transferred by a further mechanism 17 onto a conveyor band system 22.

Pieces delivered onto the band system 22 can be progressed thereby to lie in front of a pusher mechanism 23 which can be moved forwardly by discrete steps to index the pieces under the blade of the fourth guillotine 13 which can be operated to cut such pieces into yet further smaller pieces which drop onto a transverse conveyor band 24 which lies below and in front of the guillotine 13.

Referring now to FIG. 3, it will be seen that each of the transfer mechanisms 17 is mounted for pivotting movement between a horizontal position (shown in full lines) and a vertical position (shown in broken lines) on a support bracket 30 which is slidable on a rod 31 between an advanced position adjacent the guillotine G, and a retracted position spaced from the guillotine G. The transfer mechanism 17 includes a head 32 which can itself be rotated through an angle of 90° for a reason which will be apparent hereinafter. The head 32 comprises a first plate 33 having apertures therein and a second plate 34 which carries pins 35 and which is slidable between a first position wherein the pins 35 extend through the apertures in the plate 33 and a second position wherein the pins 35 are withdrawn from the plate 33.

In use, with mechanism 17 in its horizontal and advanced position, and with the plate 34 in its second position, the plate 33 forms a stop for a piece of rubber which has been indexed under the blade of the guillotine G, and which is to be transferred for further cutting at the succeeding guillotine. After the piece has been severed by the guillotine G, the plate 34 is moved to its first position to cause the pins 35 to lance the severed pipe. The mechanism 17 is then moved along the rod 31 to its retracted position and swung on the bracket 30 to its vertical position. The head 32 is then rotated through 90° to align the piece of rubber carried thereby so that its longitudinal axis is parallel with the conveyor band system C which is to progress it under the blade of the next guillotine. Finally, the piece of rubber is discharged onto the band system C by returning the plate 34 to its second position, the plate 33 then serving to push the piece from engagement with the pins 35.

Referring once again to FIGS. 1 and 2, it will be seen that pieces of rubber which drop onto the transverse conveyor bands 16 and 19 can be progressed thereby to be discharged onto a conveyor 25 which transfers them by means of a plough 27 onto a weigh band 29. Likewise pieces of rubber which drop onto the transverse conveyor bands 21 and 24 can be progressed thereby to be discharged onto a conveyor 26 which transfers them by means of a plough 28 onto the weight band 29.

The entire apparatus and all of the operational parts thereof are controlled by a computer or other automatic control means, which is programmed to assemble each successive batch of the required weight on the weigh band 29 in the following manner.

Starting with no rubber in the apparatus, a bale is received by the guillotine 10 and successive pieces are fed from the transverse conveyor 16 onto the weigh band 29 until the recorded weight is so close to the required weight that a further piece, having regard to the maximum possible tolerances, cannot safely be accepted. The next piece severed by the guillotine 10 is then transferred to the guillotine 11 and pieces are accepted from the transverse conveyor 19, if appropriate, in order to bring the recorded weight on the weigh band 29 closer to the required weight. When no further pieces can safely be received from the conveyor 19 a piece is transferred to the guillotine 12 and pieces are accepted, if appropriate, from the transverse conveyor 21 until once again no further pieces can safely be accepted, when a piece is transferred to the guillotine 13 and pieces are accepted from the transverse conveyor 24 until the required weight is obtained accurate to plus or minus the weight characteristic of the smallest pieces cut by the apparatus, that is those pieces cut by the guillotine 13.

Once each batch has been assembled, the weigh band 29 is indexed to deliver the batch to means for progressing same to the required destination, and the weigh band 29 is thus cleared in readiness for preparation of the next batch, which proceeds as before save that some transfer operations may not be necessary on account of the fact that pieces of different size may be distributed through the apparatus in preparation for guillotining at each cutting station.

It will be appreciated that it is not intended to limit the invention to the above example only, many variations being possible, without departing from the scope thereof.

For example, the apparatus may include more or less than four guillotining stations depending upon the degree of accuracy required.

Again, for example, the apparatus may have an additional guillotining station at the end of the line equipped with means to feed a variable amount of material under the guillotine blade so that the final piece cut for any batch could be designed to bring the batch weight within a very small tolerance of the exact weight required.

What is claimed is:

1. A method of automatically preparing consecutive batches, each of predetermined weight, of material from large undivided masses of such material, comprising the steps of progressing the material through a plurality of stations at each of which pieces of approximately equal size and hence of approximately equal weight are cut from same, each succeeding station cutting smaller pieces than the preceding station, and assembling each batch by selecting and collecting the required number of pieces from each of said stations to achieve said predetermined weight.

2. A method according to claim 1, wherein pieces of said material cut at each station are selectively removed from same for collection, or passed to the next succeeding station for cutting into smaller pieces.

3. A method according to claim 2, wherein, during assembly of said batch, pieces of said material are successively collected from a station until the collective weight of the pieces is such that the collection of another such piece from said station would cause said predetermined batch weight to be exceeded, whereupon a smaller piece or pieces are then taken from one or more succeeding stations until said predetermined batch weight is achieved.

4. Apparatus for automatically preparing consecutive batches, each of predetermined weight, of material from large undivided masses of such material, comprising means for progressing the material through a plurality of stations, cutting means at each station for cutting pieces of approximately equal size and hence of approximately equal weight from said material, said cutting means at each succeeding station being adapted to cut smaller pieces than those cut at the preceding station, and means for selecting and collecting the required numbers of pieces from each of said stations to achieve said predetermined weight, and assembling same to form each batch.

5. Apparatus according to claim 4, wherein means are provided at each station for removing cut pieces of material therefrom for transfer to a batch weighing device, further means being provided at each station for transferring to the next succeeding station pieces of material not to be transferred directly to batch weighing device.

6. Apparatus according to claim 5, wherein said further means comprises a device adapted to grasp a cut piece of material and present same for cutting at said next succeeding station.

7. Apparatus according to claim 6, wherein said device can be turned so that the piece of material is moved from a vertical plane into a horizontal plane.

8. Apparatus according to claim 6, wherein said device can be rotated so that the major axis of said piece of material is aligned with its direction of travel towards said next succeeding station.

9. Apparatus according to claim 6, wherein said device includes one or more pins upon which said piece of material is impaled and means for removing same from said pin or pins.

10. Apparatus according to claim 4, wherein the operational parts thereof are controlled by an automatic control means, for example a computer.

* * * * *